United States Patent [19]

Zdaniewski

[11] 4,392,070
[45] Jul. 5, 1983

[54] INSULATED COIL ASSEMBLY AND METHOD OF MAKING SAME

[75] Inventor: Joseph J. Zdaniewski, Erie, Pa.

[73] Assignee: General Electric Company, Research Triangle Park, N.C.

[21] Appl. No.: 254,689

[22] Filed: Apr. 16, 1981

[51] Int. Cl.³ .......................... H02K 1/04; H01B 7/00
[52] U.S. Cl. ........................................ 310/43; 310/45; 174/121 SR; 428/255; 428/268
[58] Field of Search ........ 174/121 SR, 122 G, 124 G; 310/43, 45, 269; 428/255, 273, 263, 260

[56] References Cited

U.S. PATENT DOCUMENTS

| | | | |
|---|---|---|---|
| 3,112,357 | 11/1963 | Inhof | 174/121 SG |
| 3,171,993 | 3/1965 | Stevens et al. | 310/269 |
| 3,434,087 | 3/1969 | Hofmann | 336/96 |
| 3,759,734 | 9/1973 | Mendelsohn et al. | 428/268 |
| 3,842,193 | 10/1974 | Johnson | 174/121 SR |
| 3,845,438 | 10/1974 | Mendelsohn et al. | 336/209 |
| 4,013,987 | 3/1977 | Foster | 336/206 |
| 4,112,183 | 9/1978 | Smith | 428/363 |
| 4,365,407 | 12/1982 | Zdaniewski et al. | 310/45 |

*Primary Examiner*—William R. Dixon, Jr.
*Attorney, Agent, or Firm*—V. P. Myles; I. M. Freedman

[57] ABSTRACT

An insulated field pole coil assembly for a dynamoelectric machine characterized by including an open-weave glass tape wound in half-lapped fashion around the energizing coil of magnet wire on the pole and coated with a continuous, void-free, crack-resistant dipping compound that is supported by the strands of the tape. In the method of the invention a coil is wound with lapped open-weave tape and immersed in dipping compound which is supported by the tape strands while the compound is cured, and thereafter, to form a crack-resistant, continuous insulating coating around the coil.

4 Claims, 2 Drawing Figures

INSULATED COIL ASSEMBLY AND METHOD OF MAKING SAME

The present invention relates to insulated electrical coil assemblies and, more particularly, concerns electrical coil assemblies that are designed for applications in which they are subject to relatively high voltages and repeated thermal cycling. The invention also relates to a method of manufacturing such insulated electrical coils.

Electrical coils constructed according to the present invention are applicable, for example, as energizing coils for field poles of dynamoelectric machines.

BACKGROUND OF THE INVENTION

It is well-known in the prior art to encapsulate various types of electrical devices with insulating resinous compositions. Numerous problems have been encountered in such past practice due to the severe stresses that are often applied to the insulating resins by the operating conditions of the associated apparatus. For example, when field poles of electric motors are provided with resinous insulating compositions on their coil windings, the insulating compositions are frequently subjected to extensive thermal cycling, mechanical vibration and often some abrasion, as well as being exposed to contaminants. The recognition of such problems has led to the development of various combinations of insulating materials for such field pole assemblies to assure maintenance of effective insulating characteristics for the assemblies for reasonably extended operating lifespans. One example of a recently introduced type of field pole assembly for dynamoelectric machines, which incorporates such a complex insulating systems is disclosed in co-pending U.S. patent application, Ser. No. 230,471, which was filed on Feb. 2, 1981, and is assigned to the assignee of the present invention.

In addition to the several problems encountered in manufacturing and applying such complex insulated field pole coil assemblies, as described in the foregoing patent application, a further significant disadvantage of resinous insulating systems has been discovered. It has been found that in some prior art field pole and coil assembly structures that use resinous insulating systems, voids or cracks are often formed in the resins, either when they are applied and cured, or during subsequent operation of the apparatus. Air trapped in such voids or cracks becomes ionized under the high voltage that is applied to the field coil during operation of the machine. This ionized air breaks down causing corona, which, in turn, damages the insulation further, often leading to complete failure of the coil. The desirability of forming void-free insulating systems to at least partially obviate the problem of corona formation and resultant insulation destruction has been recognized and various solutions for it have been proposed. For example, U.S. Pat. No. 3,434,087 discloses a crack-resistant casting composition for an electrical apparatus that is subject to cyclical thermal expansion and contraction. In that patent it is proposed to make an insulating casting compound having a coefficient of expansion that is very close to the thermal co-efficient of expansion of the metal apparatus on which the insulating resin is to be mounted. Thus, in operation of the system the cast insulating composition and the associated apparatus expand and contract at substantially the same rates, thereby reducing the risk of crack formation between the cast insulating composition and the associated metal apparatus.

In another U.S. Pat. No. 3,112,357, issued Nov. 26, 1963, there is disclosed a crack-free insulated conductor and method for making same. According to that invention a laminated insulation sheet is formed in a manner that avoids the development of cracks between adjacent laminations of the sheet. In a preferred embodiment a stretchable lamination, such as crepe paper, is impregnated with insulating resinous composition in an attempt to avoid cracking between the laminations of the insulating sheet.

In addition to those relatively early examples of attempts to avoid cracking of the insulation or the formation of cracks between layers of resinous insulation and adjacent electrical devices, several earlier inventors have disclosed methods for making void-free resinous insulating mica sheet materials for insulating coils of motors and generators or other electrical machines. For example, U.S. Pat. No. 4,013,987, which issued Mar. 22, 1977, discloses a micaceous material supported on a pliable fibrous sheet backing that is impregnated with an admixture of ingredients, including a viscous liquid epoxy resin and a suitable catalyst. The invention disclosed in that patent and the invention disclosed in U.S. Pat. No. 4,112,183, which issued Sept. 5, 1978, both involve the use of void-free mica insulating material mounted on flexible high-voltage insulating tape for insulating the coils of electrical machinery. The mice loaded tapes used in those inventions are applied in electrical apparatus by subsequently impregnating the tapes in a vacuum pressure impregnation process; thus, a disadvantage of such systems is the inherent relatively high expense involved in applying the tape and finally curing it to complete the insulation of an assembly.

A further problem involved in using insulating resins to hold electrical coil insulation in place and fill voids in the assembly to prevent the formation of corona is that the resins tend to drain out of parts of the insulation system before the resins can be cured. Efforts have been made to develop tapes that would enable insulating resin to flow into the insulation but would then prevent the resin from draining rapidly out of the system. In addition, various numbers of layers of binding tape or the application of multiply lapped tape to an insulated coil have been tried. For example, U.S. Pat. Nos. 3,759,734, issued Sept. 18, 1973 and 3,845,438, issued Oct. 29, 1974, disclose electrical coil insulation systems in which lap wound, open weave tapes are used to hold swellable resins in place adjacent an electric coil for a sufficient period of time to enable the resins to be cured before voids can be formed in the coil, by premature drainage of the resins. The inventions disclosed in those patents utilize open weave tapes having thermally-stable fibers with an elongation of at least two percent in the warp direction in order to allow a solventless resin to flow past the tapes to a conductor and then to substantially secure the resins from draining away from the conductor before they are cured.

OBJECTS OF THE INVENTION

A primary object of the invention is to provide an insulated coil assembly and method of manufacturing it whereby the disadvantages of prior art insulation systems, apparatus and methods, as discussed above, are avoided.

Another object of the invention is to provide an insulated coil assembly having a crack-resistant resinous coating that is supported by an open-weave glass tape.

Yet another object of the invention is to provide a method for making an insulated coil assembly by immersing a coil wound with open weave glass tape into a resinous dipping compound that is supported in a continuous on the coil by the glass tape until the compound is thermally cured.

Additional objects and advantages of the invention will become apparent to those skilled in the art from the description of it presented herein, considered in conjunction with the accompanying drawings.

SUMMARY OF THE INVENTION

In a preferred embodiment of the invention a dynamoelectric machine field pole is provided with an insulated coil assembly having conductive magnet wire that is coated with an insulating varnish. A lapped layer of open-weave glass fiber tape is positioned snuggly around each of the respective sides of the coil to entirely cover it and a void-free continuous coating of crack-resistant, thermal-setting dipping compound is disposed around and supported by the strands of the open weave tape, thereby to form a rugged crack resistant insulation system for the coil without requiring the use of a vacuum pressure impregnation process to apply the coating. In a preferred method of the invention, a field coil is insulated with such a dipping compound by immersing a coil having an open weave tape wrapped snuggly around all of its sides, in no more than half-lapped fashion, to support a dipping compound solution when the coil is immersed in it. After the compound solution is supported by the open weave tape, the coil is withdrawn from the solution and thermally cured to form the desired crack-resistant coating that solidly rings the coil and is structurally supported by the glass fibers of the open weave tape.

BRIEF DESCRIPTION OF THE PREFERRED EMBODIMENTS

Figure 1:
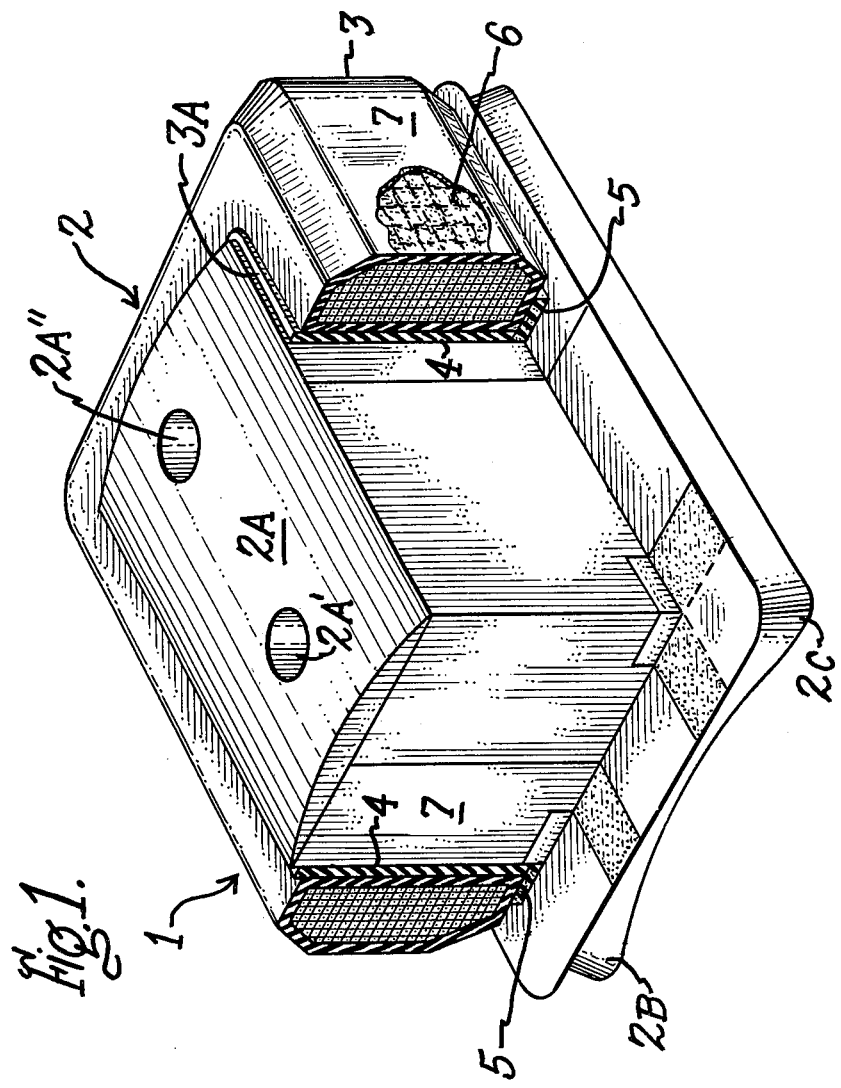
FIG. 1 of the drawing is a perspective view, partly in cross-section, of a dynamoelectric machine field pole, including an insulated coil assembly mounted thereon. The coil assembly is coated with a solid ring of crack-resistant insulating material that is mechanically supported on the coil by a partially lapped layer of open-weave glass fiber tape according to the present invention.

Referring first to FIG. 1 of the drawing, it will be seen that there is shown a field pole assembly 1 for a dynamoelectric machine. Such pole assemblies can take a variety of different configurations and the respective components of different pole assemblies are capable of being mechanically supported and electrically insulated by a large number of different structural arrangements. The particular configuration of pole assembly shown in FIG. 1, includes a laminated field pole structure 2 of a generally familiar configuration that includes a pole shank portion 2A, formed of the stacked laminations, and a pair of integral pole tip portions 2B and 2C. Normally, such a field pole will be supported in operating position by threaded bolts or other conventional mounting means secured in suitably threaded holes 2A' and 2A" shown at the upper end of the pole shank portion. Such bolts then are secured to an associated armature assembly in a well-known manner.

To provide a desired magnetic flux in the pole 2, a multi-turn coil 3 of conductive magnet wire that is coated with an insulating varnish to dielectrically separate the individual turns of the coil from one another, is mounted on the pole. The coil 3 is arranged to define a multi-sided window 3A for receiving therein a portion of the shank 2A of the pole 2. As is explained in the above-mentioned copending U.S. patent application, a suitable layer of potting compound 4 is positioned between the coil 3 and the shank 2A of field pole 2 in order to provide structural rigidity and improve thermal heat dissipating properties of the coil assembly. Also, a layer of a conventional damming compound 5 is positioned on the upper surfaces of the respective pole tip portions 2B and 2C to structurally support the coil 3 and to prevent the potting compound 4 from escaping from between the coil and field pole prior to jelling and curing of the potting compound.

According to the present invention, a lapped layer of open-weave glass fiber tape 6 is positioned snuggly around each of the respective sides of the coil 3 to entirely cover the coil. Suitable tapes for this purpose are, for example, a heat-cleaned fiber glass tape that is commercially available from General Electric Co. (the assignee of this invention) by ordering GE Material 22L14. Alternatively, Form-I-Glastape manufactured by Carolina Narrow Fabric Co. of Winston-Salem, N.C. is suitable for this purpose.

In the preferred form of the invention, the tape 6 is at most half-lapped to afford the objectives of the invention stated above. Finally, the coil assembly shown in FIG. 1 includes a substantially void-free, continuous coating 7 of crack-resistant thermosetting dipping compound that is thermally stable in a range of temperatures from −50° C. to 150° C. The coating 7 is disposed around and supported by the strands of the open-weave tape 6 to form a solid ring insulated coil assembly that is formed without using a vacuum-pressure impregnation process.

The dipping compound used in forming the coating 7 of the preferred embodiment of the invention is a thixotropic epoxy resin. In practicing various alternative modifications of the invention, the dipping compound used to solidly ring the coil 3 may be taken from a class of dipping compounds including; polyimides, polyamides, silicones, polyesters, polyetherimides and polyurethanes. An important feature of the invention is that the solid ringing coating is mechanically supported on the respective strands of the open-weave glass tape, so that the coating is structurally strong, and so that the coating is generally uniformly distributed over the surface of the coil 3 by being supported in a generally uniform thickness by the glass tape 6 while the coating solidifies during a curing operation.

With this unique insulated coil assembly, it has been found that no more than a one-half lapped layer of tape 6 is required on the coil 3 in order to provide the sought after objectives of the invention, whereby the coating 7 is supported structurally both before and after it is cured in place around the coil 3. A significant advantage of the invention is that a wide variety of different epoxy thixotropic dipping compounds can be used to form the coating 7. For example, several such commercially available dipping compounds can be purchased under the following trade names; Amicon 926-68, Sterling E-301, Sterling E-301 LV-3, and E-301 LV-4 and General Electric Company Dipping Compound No. GE 110-036. All of these dipping compounds will form a crack-resistant insulation system that penetrates the open weave structure of the tape 6 even when the compounds are very viscous due to being heavily filled with conventional filler materials. However, because of the open weave, lenoweave or knitted structure of the tape 6, a high degree of conformability of the tape 6 with the corners and irregular surfaces of coil 3 is achieved, so that no more than one-half lapped layer of tape 6 is required to obtain the objectives of the invention.

Figure 2:
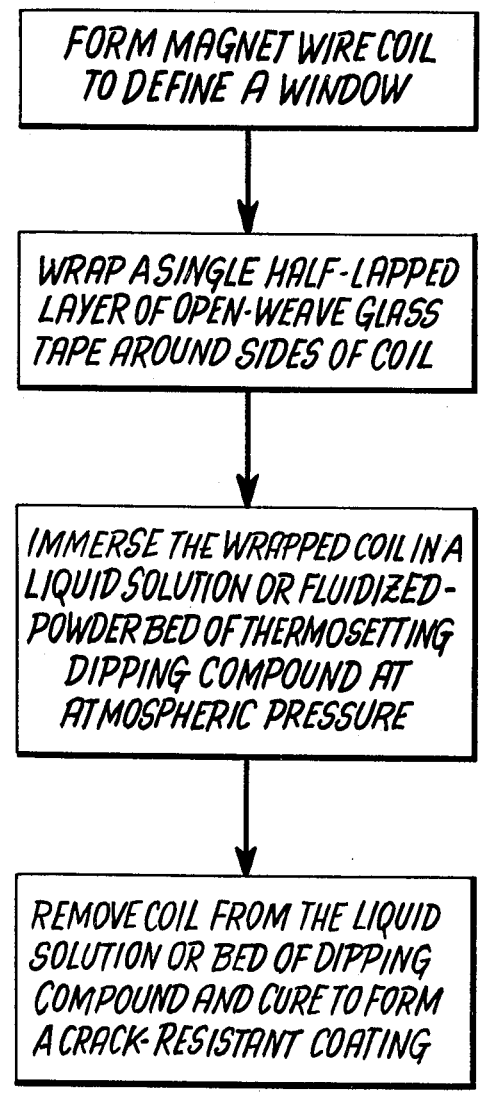
FIG. 2 is a flow chart illustrating preferred steps of the method of the invention.

According to the method of the invention in a preferred form of it, an insulated coil assembly such as that shown in FIG. 1 is made for a dynamoelectric machine field pole by practicing the following process steps, as generally outlined in FIG. 2 of the drawing: First, a suitable coil of insulated magnet wire is formed to define a window for receiving therein a part of a field pole shank. Next, a half-lapped layer of open-weave, glass fiber tape is wrapped around each of the sides of the coil, then the wrapped coil is dipped into a bath of thermosetting dipping compound, such as one of the compounds described above. Finally, the coil is withdrawn from the bath and thermally cured to form the dipping compound in a continuous, substantially void-free, crack-resistant coating that is disposed solidly around the coil and supported on the strands of the open weave tape. In practicing the preferred method of the invention, the dipping compound is maintained at essentially the pressure of its ambient atmosphere during both the dipping step and the subsequent curing operation; thus, the expense of vacuum pressure impregnation is avoided in practicing the invention.

In a modified process of the invention, rather than providing a bath of dipping compound solution, a coil having a half-lapped layer of open-weave tape around it is dipped into a fluidized bed of dipping compound powder for a sufficient period of time to adhere a desired thickness of coating around and between the strands of the open weave tape. During such a fluidized bed coating operation, the coil can either be heated to ahere the dipping compound powder to it and the surrounding open-weave tape, or the coil can be preheated before it is placed into the fluidized bed to partially melt and adhere the powdered dipping compound thereto. After a suitable thickness of fluidized powder has adhered to the coil and around the strands of the open weave tape, the coil is withdrawn from the fluidized bed of dipping compound powder and the coating of dipping compound is cured to form the desired solid ringing insulating coating around the coil.

Further modifications and alternative embodiments of the invention will be apparent to those skilled in the art from the description of it presented herein, accordingly, it is my intention to encompass within the following claims the true scope of the invention.

What I claim and desire to secure by Letters Patent of the United States is:

1. An insulated coil assembly for a field pole of a dynamoelectric machine, said coil assembly comprising; a coil of conductive wire coated with an insulating varnish and arranged to define a multi-side window for receiving therein a portion of a field pole, a lapped layer of open-weave glass fiber tape positioned snuggly around each of the respective sides of said coil to entirely cover the coil, and a substantially void free, continuous, crack-resistant, thermoset dipping compound that is thermally stable in a range of temperature from $-50°$ C. to $150°$ C., forming a cured solid ringing coating that is generally uniformly distributed over the surface of the coil and is supported in a generally uniform thickness by said tape.

2. An invention as defined in claim 1 wherein said lapped layer of tape consists of a single half-lapped layer of substantially uniformly spaced turns of tape.

3. An invention as defined in claim 2 wherein said dipping compound is a thixotropic epoxy resin.

4. An invention as defined in claim 1 wherein said dipping compound is taken from a class of dipping compounds, including: polyamides, polyesters, silicones, polyetherimides, polyimides and polyurethanes.

* * * * *